Figure 1:
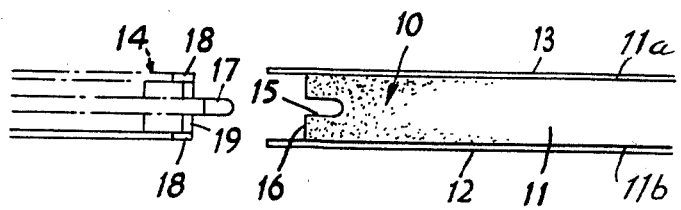

United States Patent [19]

Gwynne

[11] 3,998,679
[45] Dec. 21, 1976

[54] METHOD OF APPLYING REINFORCING STRIPS TO THE EDGES OF BUILDING BOARDS

[75] Inventor: Thomas Gwynne, Loughborough, England

[73] Assignee: BPB Industries, Inc., London, England

[22] Filed: Sept. 8, 1975

[21] Appl. No.: 611,119

Related U.S. Application Data

[60] Continuation of Ser. No. 475,346, May 31, 1974, abandoned, which is a division of Ser. No. 270,394, July 10, 1972, Pat. No. 3,849,235.

[52] U.S. Cl. .................................. 156/42; 156/257; 156/293; 52/601; 52/619; 428/124
[51] Int. Cl.² .................. B32B 31/18; B32B 3/04; B32B 3/02; E04B 2/32
[58] Field of Search ............... 428/57, 61, 81, 83, 428/122, 121, 124, 67, 192; 52/416, 459, 586, 593, 598, 601, 617, 619; 156/42, 257, 293, 254

[56] References Cited
UNITED STATES PATENTS 1,641,648   9/1927   Speer .............................. 428/121
1,690,229   11/1928  Jenkins ........................... 428/122
2,682,909   7/1954   Claff et al. ....................... 156/257 X Primary Examiner—Philip Dier
Attorney, Agent, or Firm—Samuel Kurlandsky; Donnie Rudd; Robert H. Robinson

[57] ABSTRACT

The invention relates to cementitious building board, such as gypsum board, having reinforcing strips along one or more of its edges. Such strips can be incorporated in such board faced with paper or other sheet material by cutting back the core leaving the edges of the sheets projecting, applying the strip and returning the edges of the sheets, to be adhesively secured to the face of the strip. The edge may have any desired profile but of particular interest is a board or tile having a groove, or kerf along at least two opposite edges of the core, the reinforcing strips being corresponding channel sections with lateral flanges to which the edges of the facing sheets are secured. The reinforced boards are useful in the production of ceilings and walls and, in the case of panels and tiles with kerfed edges, can be mounted by invisible or "secret" fixing devices.

2 Claims, 14 Drawing Figures

METHOD OF APPLYING REINFORCING STRIPS TO THE EDGES OF BUILDING BOARDS

This is a continuation of application Ser. No. 475,346, filed May 31, 1974 now abandoned, which itself is a divisional application of U.S. application Ser. No. 270,394, filed on July 10, 1972 now U.S. Pat. No. 3,849,235.

The present invention relates to building boards and in particular to improved lined boards, including tiles, planks and panel elements, having a core of cementitious material, especially of gypsum.

In dry constructions for walls and ceilings it is often desired to mount the constituent panels by so-called "secret" fixing methods in order to present a surface unblemished by visible means of attachment. One way of providing for such fittings would be to employ boards or tiles having edge grooves or kerfs into which the flanges of supporting studs can enter to support the boards. Provision of such kerfs in the edge of gypsum panels raises problems, however, on account of the relatively low strength of the gypsum core of the panel, whether the kerfs are formed by grooving the edges of previously formed panels or by forming in the panels at the casting or forming stage.

It is one object of this invention to provide a way of applying reinforcing strips to lined boards having edges of any profile, but more especially kerfed edges.

According to the present invention a board of satisfactory strength can be made by cutting back the core of a board faced with paper or other sheet material along at least one edge to leave the facing sheets projecting therefrom, placing a reinforcing strip in contact with the prepared edge, returning the projecting edges of the sheet material over at least part of an outwardly directed face of the strip and adhesively securing them thereto. Preferably the width of the strip is substantially equal to the thickness of the edge of the core.

The reinforcing strip can be flat or profiled, and where it has projections towards the core, the edge of the core is cut to a similar profile. For example, a kerfed board can be made by cutting back the core along at least one edge of a gypsum board faced with paper or other sheet material, to form a groove or kerf along the said edge while leaving the facing sheets projecting therefrom, inserting into the groove or kerf a formed channel or kerf element capable of reinforcing the grooved or kerfed edge and having laterally extending flanges along both edges thereof, and returning the projecting edges of the sheet material over the flanged edges of the channel or kerf element and adhesively securing them thereto. Weakening of the edges of the core can be reduced if the groove or kerf is cut with rounded rather than square bottom inner edges. The channel or kerf element should then also be rounded at the bottom to correspond.

The invention thus provides a building board faced with paper or other sheet material, having along at least one edge a reinforcing strip, the adjacent edges of the facing sheets being turned over at least part of an outwardly-directed face of the reinforcing strip and adhesively secured thereto. The reinforcing strip preferably extends laterally to be coterminous with the edges or shoulders of the board (apart from any facing sheet). It is not necessary to employ adhesive to bond the reinforcing strip to the core, but adhesive can be employed if desired to form an additional bond. The reinforcing strip can be made to provide a close fit with the edge of the core by suitably profiling the edge and the strip, and the adherent facing sheets help to retain the strip and to protect it from external mechanical agencies which might dislodge it.

The reinforcing strip can be of any material having the strength necessary to provide reinforcement for the edge, for example metal or plastics material. In the preferred panels, however, the reinforcing strip is formed from rust-protected sheet metal. Where the reinforcing strip is of suitable non-reentrant profile, this can itself be produced continuously by rolling from metal strip in the plant for the continuous production of the panel elements and then continuously applied to the edge of the panel elements advancing through the plant.

The reinforced edges which characterise this invention can be produced on tapered edge board as well as on the more usual square edge board. Furthermore, cutting of the panel edges gives a truer edge than is obtained at the initial casting of paper-lined board on a conventional plasterboard machine so that it becomes possible to obtain a finer or more accurate join between adjacent boards or tiles in a dry construction.

Still finer joins can be achieved in wall or ceiling structures wherein the web of a support stud engages the kerfs of two adjacent panels having kerfed edges if the edge or shoulder of each board on what is intended to be the rearward side of the groove or kerf is cut back, or rebated, further than the edge or shoulder at the front or forward side. This enables the web of the supporting stud to be accommodated between adjacent panel elements while bringing their front edges into complete abutment, giving a join which is almost invisible when viewed from a distance and which, in the case of square-edged boards, can be directly papered-over or otherwise decorated without taping or other joint-filling procedure.

The invention will now be described by way of example with reference to the accompanying drawings in which FIGS. 1 to 4, 5 to 8, 9 and 10, and 11 to 14 represent respectively, in diagrammatic section, successive stages in the manufacture of four different panel elements according to the present invention.

FIG. 1 shows one edge of a gypsum board panel 10 having a core 11 and front and rear facing sheets 12 and 13. The panel may be of conventional plasterboard, made on a conventional machine, and the facing or lining sheets may be of, for example, paper or, in the case of panels with a decorative face, they may be faced on at least the front face with plastics material bonded to the paper surface of the board.

Cutters are indicated at 14 which, when the edge of the panel 10 is brought into contact with them, cut back the edge of the core 11 to form a groove or kerf 15, having a rounded bottom or internal corners, and the shoulders 16 shown in the Figure. The cutters may include a central blade 17 to form the groove and side blades 18 to cut away the core at the inner surface of the lining sheets. These blades may be of the circular saw type, and additional blades 19, which may rotate with the saw blades, can be provided to clear the shoulders of the cut edge to the desired depth.

Figure 2:
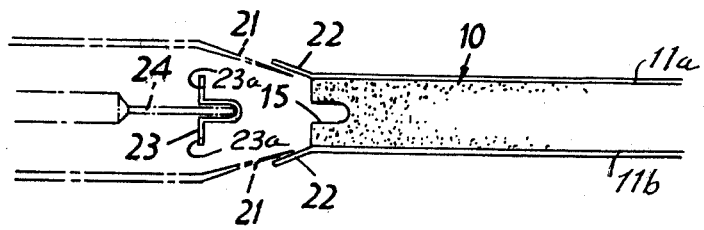

In FIG. 2, the panel is being advanced past guide plates 21, which turn back and hold back the projecting edges 22 of the lining sheets, while a previously formed channel or kerf element 23, having flanges along both edges and a rounded bottom or internal corners, is pushed into place in the groove 15 by a suitable tool 24. The channel element 23 can be made continuously by rolling from metal strip, and this can be done at the same time in the same plant and the freshly rolled element introduced continuously into the groove in the edge of the continuously advancing panel.

Figure 3:
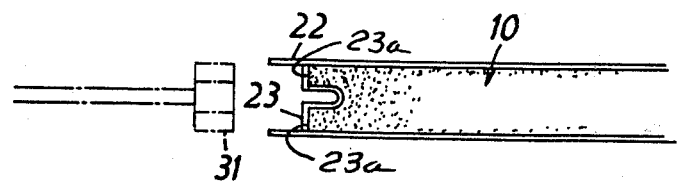

FIG. 3 shows the next stage in manufacture, when an adhesive, for example a hot melt adhesive, is applied to the inner surfaces of the projecting edges 22 of the lining sheets by means of nozzles or other suitable applicators 31. This Figure also shows that the reinforcing element 23 extends laterally to be coterminous with the edges of the core at the inner surfaces of the facing sheets 22.

Figure 4:
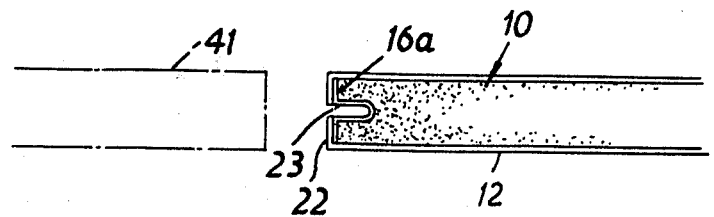

Finally, the edges 22 of the sheets are turned inward, by appropriate guides, over the flanges of the channel or kerf element 23 to adhere to the latter and are rolled into position, as shown in FIG. 4, by a finishing roller 41.

Although in the drawings there is shown a square-edged board provided with a kerfed edge having shoulders of equal height on either side of the kerf, it will be readily apparent to those skilled in this art that suitable modification to the cutters 17, 18, 19 can provide one shoulder which is cut back or rebated beyond the level of the other, notably the shoulder 16a (FIG. 4) if the surface 12 is the front face of the board. It will also be apparent that a similar reinforcing edge kerf can be applied to tapered edge board. Furthermore, if the profile of the front flange of the element 23 is modified, and the groove and shoulder in the core correspondingly modified, the panel may be given an edge formation of desired profile for use, for example where the joint between adjacent boards is to be a feature of the assembled construction.

Figure 5:
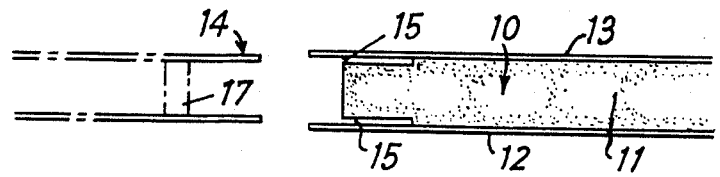

FIG. 5 shows one edge of a gypsum board panel 10 having a core 11 and front and rear facing sheets 12 and 13. Cutters, which may be of the circular saw type, are indicated at 14. When the edge of the panel 10 is brought into contact with the cutters, they cut back the edge of the core 11 adjacent to the facing sheets at 15 to form two deep rebates. The cutters may include a central blade 17 to cut back the core between the rebates.

Figure 6:
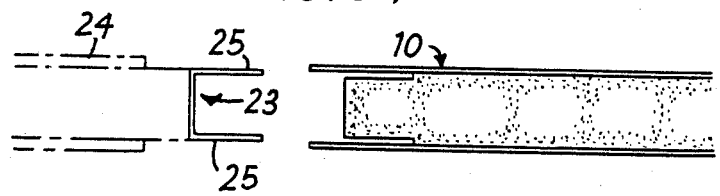

In FIG. 6, the flanges 25 of a previously formed channel element 23, which can be of rolled metal, are pushed into place over the edge of the board between the cut faces and the facing sheets by a suitable tool 24. The projecting edges of the facing sheets can at this stage be held back by guides as in FIG. 2.

Figure 7:
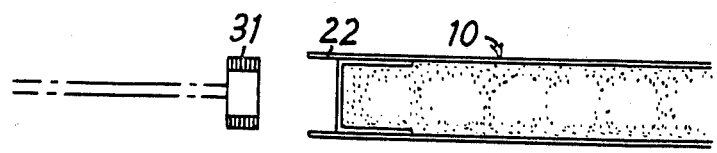

FIG. 7 shows the next stage in manufacture, when an adhesive, for example a hot melt adhesive, is applied to the inner surfaces of the projecting edges 22 of the lining sheets by means of nozzles or other suitable applicators 31.

Figure 8:
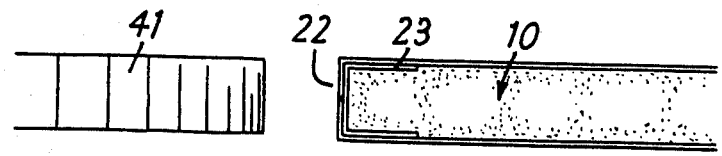

Finally, the edges 22 of the sheets are turned inward, by appropriate guides, over the web of the channel element 23 to adhere to the latter and are rolled into position, as shown in FIG. 8, by a finishing roller 41.

Figure 9:
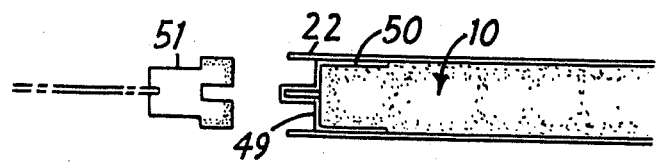
Figure 10:
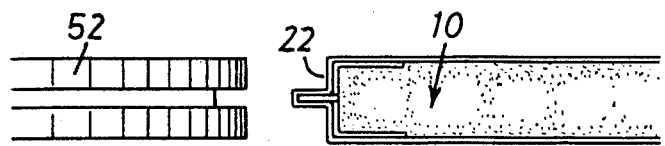

In FIG. 9, a tongued channel element 49 is shown after insertion of its flanges 50 between the cut faces and facing sheets of a panel element 10 prepared as described in relation to FIG. 5. A suitable applicator 51 is used to apply adhesive to portions of the channel element and to the inner surfaces of the projecting edges 22 of the facing sheets. The projecting edges 22 are then turned inward and rolled into place by a roller 52, as shown in FIG. 10.

Figure 11:
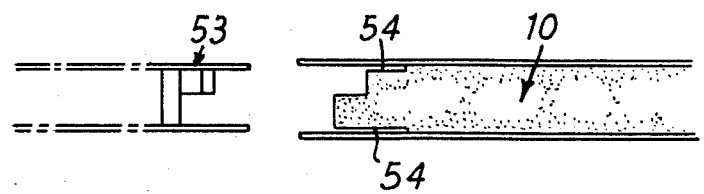
Figure 12:
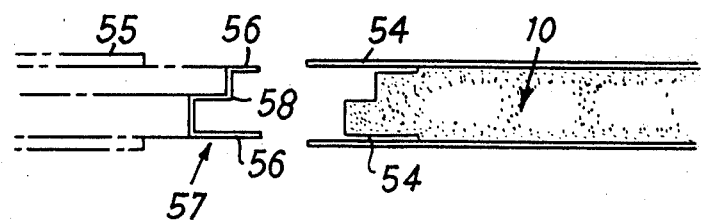

In FIG. 11, cutters 53 are shown capable of cutting back the edge of the board 10 to a stepped profile with deep rebates 54 adjacent to the facing sheets. FIG. 12 shows an appropriate tool 55 inserting the flanges 56 of a channel element 57 over the cut edge of the panel element. The web 58 of the channel element is stepped to mate with the cut edge of the panel element.

Figure 13:
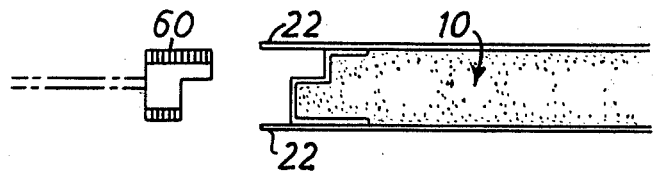
Figure 14:
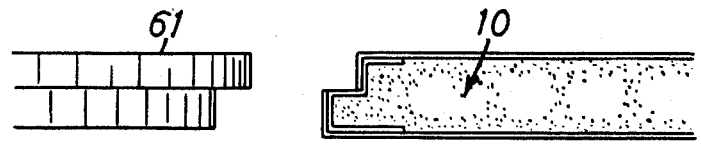

FIG. 13 shows an applicator 60 for applying adhesive to the inner surfaces of the projecting edges 22 of the facing sheets of the panel element. The projecting edges are then turned inwards, over the channel element, and rolled into place by a roller 61 as shown in FIG. 14.

Panels according to the present invention can be made in any size, for example as wall or ceiling panels or as tiles, and can be finished in any suitable material, for example paper or plastic material.

What I claim is:

1. In the process for the production of reinforced board having a cementitious set core faced with facing sheets, the steps comprising:
   cutting back the set core along at least one edge there to leave said facing sheets projecting therefrom beyond the edge of the core;
   providing a reinforcing strip having a single projection adapted to be directed toward the core with one face of said strip being outwardly directed;
   cutting said cut back edge of the core to form a single recess having a profile to accommodate the projection of said reinforcing strip and inserting said projection into said recess;
   returning at least one of the projecting edges of said facing sheets over at least a part of said outwardly directed face of the strip; and
   adhesively securing said facing sheet edge to said face.

2. A process for the production of reinforced gypsum board comprising the steps of:
   forming gypsum board comprising a set gypsum core and facing sheets thereon;
   cutting back the core along the entire portion of at least one edge thereof leaving the facing sheets projecting beyond the edge of said core, and further cutting the edge of said core to form a single groove or kerf along said edge;
   inserting into the groove or kerf a formed channel element capable of reinforcing said edge having a single centrally positioned channel positioned in said groove or kerf and having laterally extending flanges along both edges thereof;
   returning the projecting edges of said sheet material over the flanged edges of the channel element; and
   adhesively securing said facing sheet edges to said flanges.

* * * * *